United States Patent
Fujii et al.

(10) Patent No.: US 12,005,991 B2
(45) Date of Patent: Jun. 11, 2024

(54) BRAKE CALIPER FOR A BICYCLE

(71) Applicant: SHIMANO INC., Sakai (JP)

(72) Inventors: Nobuyoshi Fujii, Sakai (JP); Kazuya Kuwayama, Sakai (JP); Kazuki Koshiyama, Sakai (JP); Toyoto Shirai, Sakai (JP); Yusuke Hosomi, Sakai (JP)

(73) Assignee: SHIMANO INC., Sakai (JP)

( * ) Notice: Subject to any disclaimer, the term of this patent is extended or adjusted under 35 U.S.C. 154(b) by 160 days.

(21) Appl. No.: 17/542,143

(22) Filed: Dec. 3, 2021

(65) Prior Publication Data
US 2023/0174191 A1 Jun. 8, 2023

(51) Int. Cl.
*F16D 65/78* (2006.01)
*B62L 1/00* (2006.01)
*F16D 65/00* (2006.01)
*F16D 65/097* (2006.01)
*F16D 55/00* (2006.01)

(52) U.S. Cl.
CPC .......... *B62L 1/005* (2013.01); *F16D 65/0068* (2013.01); *F16D 65/0978* (2013.01); *F16D 2055/0016* (2013.01)

(58) Field of Classification Search
CPC .. B62L 1/005; F16D 65/0068; F16D 65/0978; F16D 2055/0016
USPC .......................................... 188/73.36–73.38
See application file for complete search history.

(56) References Cited

U.S. PATENT DOCUMENTS

| 9,903,432 | B2 | 2/2018 | Gallagher |
| 10,385,937 | B2* | 8/2019 | Iwai .................... F16D 65/0068 |
| 2008/0135353 | A1 | 6/2008 | Takeo et al. |
| 2021/0348661 | A1 | 11/2021 | Egawa et al. |
| 2023/0175562 | A1* | 6/2023 | Koshiyama ............. B62L 1/005 |
| | | | 188/251 R |

FOREIGN PATENT DOCUMENTS

| DE | 10 2007 055 763 A1 | 6/2008 |
| DE | 10 2014 112 665 A1 | 3/2016 |
| JP | 2015-96748 A | 5/2015 |

* cited by examiner

*Primary Examiner* — Christopher P Schwartz
(74) *Attorney, Agent, or Firm* — Oliff PLC (57) ABSTRACT

A brake caliper for a bicycle includes a housing configured to be installed on the bicycle, the bicycle including a disc attached to a wheel of the bicycle. A brake pad is installed within the housing and is configured to move between a braking position and a non-braking position. The braking position is a location within the housing where the brake pad contacts the disc when the housing is installed on the bicycle. The non-braking position is a location within the housing where the brake pad is further from the disc than in the braking position. The caliper also includes a biasing member configured to bias the brake pad in a downstream direction within the housing with the brake pad is in the non-braking position, the downstream direction being parallel to a direction of rotation of the disc when a wheel of the bicycle is rotating to move the bicycle forward.

20 Claims, 8 Drawing Sheets

BRAKE CALIPER FOR A BICYCLE

BACKGROUND

In recent years, bicycles, electric bicycles, and other small vehicles have been provided with hydraulic brake systems to increase braking performance. The hydraulic brake system includes a caliper that surrounds a disc attached to a hub of a wheel of the bicycle. The brake system is typically actuated by a hydraulic operating apparatus such as a brake lever that causes a friction member on a brake pad within the caliper to contact the disc. Friction resulting from the contact of the friction member with the disc slows the rotation of the disc when the wheel is rotating, and thus slows the rotation of the wheel.

SUMMARY

Bicycles, and especially mountain bicycles and gravel bicycles, are subject to jolts and vibration when being ridden over the rough terrain for which they are designed. These jolts and vibrations can cause rattling of components on the bicycle. One component prone to rattling is the brake pad, which can rattle within the caliper when jolted or vibrated. The rattling can be annoying to a rider and/or give the rider the impression that the brake system is not adjusted properly. Thus, there is a demand to reduce or prevent the ability of the brake pad to rattle within the caliper. Exemplary embodiments of the inventive brake pad for a bicycle described herein address this need. For example, exemplary embodiments provide a biasing member that biases the brake pad against an inner surface of the caliper thereby limiting the ability of the brake pad to move within the caliper.

According to a first aspect of one or more exemplary embodiments, a brake caliper for a bicycle includes a housing configured to be installed on the bicycle, the bicycle including a disc attached to a wheel of the bicycle. A brake pad is installed within the housing and is configured to move between a braking position and a non-braking position. The braking position is a location within the housing where the brake pad contacts the disc when the housing is installed on the bicycle. The non-braking position is a location within the housing where the brake pad is further from the disc than in the braking position. The caliper also includes a biasing member configured to bias the brake pad in a downstream direction within the housing with the brake pad is in the non-braking position, the downstream direction being parallel to a direction of rotation of the disc when a wheel of the bicycle is rotating to move the bicycle forward.

According to this configuration, the biasing member restricts movement of the brake pad within the caliper. By restricting such movement, rattling of the brake pad within the caliper is beneficially reduced or prevented.

According to a second aspect of one or more exemplary embodiments, the brake caliper according to the first aspect is configured so that the housing includes a first housing wall that is located in the downstream direction relative to the brake pad. The biasing member is configured to bias the brake pad against the first housing wall so that the brake pad contacts the first housing wall in both the braking position and the non-braking position. According to this configuration, the biasing member restricts movement of the brake pad within the caliper. By restricting such movement, rattling of the brake pad within the caliper is beneficially reduced or prevented.

According to a third aspect of one or more exemplary embodiments, the brake caliper according to the second aspect is configured so that the housing includes a second housing wall that is located in an upstream direction relative to the brake pad. The upstream direction is opposite the downstream direction. The biasing member contacts both the second housing wall and the brake pad in order to bias the brake pad in the downstream direction. According to this configuration, the biasing member restricts movement of the brake pad within the caliper. By restricting such movement, rattling of the brake pad within the caliper is beneficially reduced or prevented.

According to a fourth aspect of one or more exemplary embodiments, the brake caliper according to the third aspect is configured so that the brake pad includes a friction member and a support member. The support member has an extension portion extending beyond the friction member in a direction parallel to a radial direction of the disc in the state of the housing being installed on the bicycle. The biasing member contacts the extension portion in order to bias the brake pad in the downstream direction. According to this configuration, the biasing member restricts movement of the brake pad within the caliper. By restricting such movement, rattling of the brake pad within the caliper is beneficially reduced or prevented.

According to a fifth aspect of one or more exemplary embodiments, the brake caliper according to the fourth aspect is configured so that the biasing member includes a contact surface that contacts the support member, a lower tab, and an upper tab. The lower tab is located radially inward from the contact surface in the radial direction of the disc in the state of the housing being installed on the bicycle. The upper tab is located radially outward from the contact surface in the radial direction of the disc in the state of the housing being installed on the bicycle. Both the lower tab and the upper tab contact the second housing wall in order to bias the brake pad in the downstream direction. According to this configuration, the biasing member restricts movement of the brake pad within the caliper. By restricting such movement, rattling of the brake pad within the caliper is beneficially reduced or prevented.

According to a sixth aspect of one or more exemplary embodiments, the brake caliper according to the fifth aspect is configured so that the upper tab is connected to the second housing wall. According to this configuration, the biasing member is reliably supported by the caliper housing so that the biasing function can be reliably performed.

According to a seventh aspect of one or more exemplary embodiments, the brake caliper according to the sixth aspect is configured so that the upper tab is embedded within the second housing wall. According to this configuration, the biasing member is reliably supported by the caliper housing so that the biasing function can be reliably performed.

According to an eighth aspect of one or more exemplary embodiments, the brake caliper according to any one of the fifth through seventh aspects is configured so that the lower tab contacts the second housing wall, but is not connected to the second housing wall. According to this configuration, the biasing member is allowed sufficient range of motion to flex while also being reliably supported by the caliper housing so that the biasing function can be reliably performed.

According to a ninth aspect of one or more exemplary embodiments, the brake caliper according to any one of the first through eighth aspects is configured so that the biasing member is made of a resilient material. According to this configuration, the biasing function can be reliably performed.

According to a tenth aspect of one or more exemplary embodiments, a brake caliper for a bicycle includes a housing configured to be installed on the bicycle, the bicycle including a disc attached to a wheel of the bicycle. The housing includes a bleed port. The caliper includes a brake pad configured to move between a braking position and a non-braking position. The braking position is a location in the housing where the brake pad contacts the disc in a state where the housing is installed on the bicycle. The non-braking position is a location in the housing where the brake pad is further from the disc than the braking position in a state where the housing is installed on the bicycle. The caliper also includes a biasing member configured to bias the brake pad within the housing in a direction away from the bleed port in the non-braking position.

According to this configuration, the biasing member restricts movement of the brake pad within the caliper. By restricting such movement, rattling of the brake pad within the caliper is beneficially reduced or prevented.

According to an eleventh aspect of one or more exemplary embodiments, the brake caliper according to the tenth aspect is configured so that the housing includes a first housing wall that is located in the direction away from the bleed port relative to the brake pad. The biasing member is configured to bias the brake pad against the first housing wall so that the brake pad contacts the first housing wall in both the braking position and the non-braking position. According to this configuration, the biasing member restricts movement of the brake pad within the caliper. By restricting such movement, rattling of the brake pad within the caliper is beneficially reduced or prevented.

According to a twelfth aspect of one or more exemplary embodiments, the brake caliper according to the eleventh aspect is configured so that the housing includes a second housing wall that is located in a direction toward the bleed port relative to the brake pad. The biasing member contacts both the second housing wall and the brake pad in order to bias the brake pad away from the second housing wall in the direction away from the bleed port. According to this configuration, the biasing member restricts movement of the brake pad within the caliper. By restricting such movement, rattling of the brake pad within the caliper is beneficially reduced or prevented.

According to a thirteenth aspect of one or more exemplary embodiments, the brake caliper according to the twelfth aspect is configured so that the brake pad includes a friction member and a support member. The support member has an extension portion extending beyond the friction member in a direction parallel to a radial direction of the disc in the state of the housing being installed on the bicycle. The biasing member contacts the extension portion in order to bias the brake pad in the direction away from the bleed port. According to this configuration, the biasing member restricts movement of the brake pad within the caliper. By restricting such movement, rattling of the brake pad within the caliper is beneficially reduced or prevented.

According to a fourteenth aspect of one or more exemplary embodiments, the brake caliper according to the thirteenth aspect is configured so that the biasing member includes a contact surface that contacts the support member, a lower tab, and an upper tab. The lower tab is located radially inward from the contact surface in the radial direction of the disc in the state of the housing being installed on the bicycle. The upper tab is located radially outward from the contact surface in the radial direction of the disc in the state of the housing being installed on the bicycle. Both the lower tab and the upper tab contact the second housing wall in order to bias the brake pad in the direction away from the bleed port. According to this configuration, the biasing member restricts movement of the brake pad within the caliper. By restricting such movement, rattling of the brake pad within the caliper is beneficially reduced or prevented.

According to a fifteenth aspect of one or more exemplary embodiments, the brake caliper according to the fourteenth aspect is configured so that the upper tab is connected to the second housing wall. According to this configuration, the biasing member effectively anchored so that it can restrict movement of the brake pad within the caliper.

According to a sixteenth aspect of one or more exemplary embodiments, the brake caliper according to the fifteenth aspect is configured so that the upper tab is embedded within the second housing wall. According to this configuration, the biasing member effectively anchored so that it can restrict movement of the brake pad within the caliper.

According to a seventeenth aspect of one or more exemplary embodiments, the brake caliper according to any one of the fourteenth through sixteenth aspects is configured so that the lower tab contacts the second housing wall, but is not connected to the second housing wall. According to this configuration, the biasing member has the freedom to partially move as it deforms so that it can effectively bias the brake pad within the caliper.

According to an eighteenth aspect of one or more exemplary embodiments, the brake caliper according to any one of the tenth through seventeenth aspects is configured so that the biasing member is made of a resilient material. According to this configuration, the biasing member can effectively bias the brake pad within the caliper.

According to a nineteenth aspect of one or more exemplary embodiments, a brake caliper for a bicycle includes a housing configured to be installed on the bicycle, the bicycle including a disc attached to a wheel of the bicycle. The housing includes a first brake pad, a second brake pad, and a biasing member. The first brake pad is installed within the housing and is configured to contact the disc in a state where the housing is installed on the bicycle. The first brake pad includes a first friction member and a first support member that has a first extension portion extending beyond the first friction member in a direction parallel to a radial direction of the disc. The second brake pad is installed within the housing and is configured to contact the disc in a state where the housing is installed on the bicycle. The second brake pad is provided in an opposite side from the first brake pad with respect to the disc. The second brake pad includes a second friction member and a second support member that has a second extension portion extending beyond the second friction member in a direction parallel to the radial direction of the disc. The biasing member contacts the first extension portion of the first brake pad and the second extension portion of the second brake pad simultaneously and is configured to bias both the first brake pad and the second brake pad in a same direction parallel to a rotational direction of the disc.

According to this configuration, the biasing member restricts movement of both of the brake pads within the caliper. By restricting such movement, rattling of the brake pads within the caliper is beneficially reduced or prevented.

According to a twentieth aspect of one or more exemplary embodiments, the brake caliper according to the nineteenth aspect is configured so that the biasing member is made of a resilient material. According to this configuration, the biasing member can effectively bias the brake pads within the caliper.

DETAILED DESCRIPTION OF EXEMPLARY EMBODIMENTS

It will be apparent to the skilled artisan in the small vehicle field, and in particular the bicycle field, from this disclosure that the following descriptions of exemplary embodiments are provided as examples that inform and provide support for the appended claims, but the particular details of the examples need not limit the broad inventive principles described herein or included in the appended claims.

Figure 1:
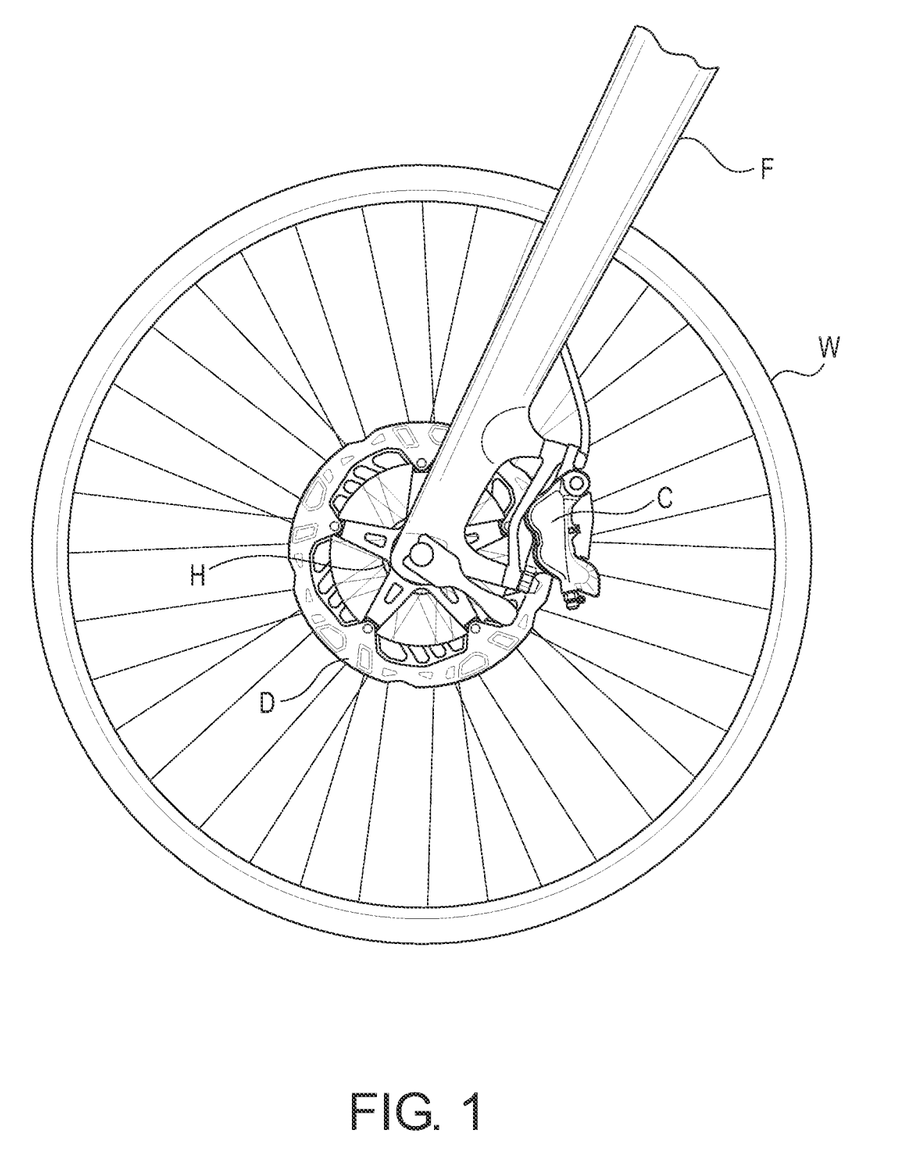
FIG. 1 shows an exemplary hydraulic brake system.

As described above, bicycles, electric bicycles, and other small vehicles can be provided with hydraulic brake systems to increase braking performance. An exemplary hydraulic brake system is shown in FIG. 1. In general, a disc D (sometimes referred to as a "rotor") is attached to the hub H of a bicycle wheel W. A brake caliper C is mounted on a front fork F of the bicycle. That is, the caliper C includes a housing configured to be installed on the bicycle with a disc attached to its wheel. The front fork F can be a rigid fork, as is commonly used on a road or gravel bicycle, or a suspension fork, as is commonly used on a mountain bike. As shown in FIG. 1, and explained in more detail later, the disc D passes through a gap in the caliper C and between two brake pads that are inside the caliper C. That is, a first brake pad is configured to contact the disc D in a state where the housing of the caliper C is installed on the bicycle and a second brake pad is configured to contact the disc D in a state where the housing of the caliper C is installed on the bicycle. When hydraulic braking force is applied to an actuator (not shown), each side of the disc D is forcibly contacted by a respective one of the brake pads within the caliper C. This state is referred to herein as the brake pads being in a "braking position."

The forcible contact of the brake pads with the disc D creates friction that slows the rotation of the disc D. Because the disc D is attached to the hub H of the wheel W, the slowing of the rotation of the disc D correspondingly slows the rotation of the wheel W to effectuate braking of the bicycle. When no hydraulic force is applied to the actuator, the brake pads either do not contact the disc D or incidentally contact the disc D without applying effective pressure on the disc D. These states are referred to herein as the brake pads being in a "non-braking position." So each brake pad is configured to move between a braking position and a non-braking position, the braking position being a location within the housing where the brake pad contacts the disc in a state where the housing is installed on the bicycle, and the non-braking position being a location within the housing where the brake pad is further from the disc than the braking position in a state where the housing is installed on the bicycle.

Although, only a front wheel W is depicted in the exemplary system of FIG. 1, in most applications, a similar system is also applied to the rear wheel of the bicycle. That is, although it is mounted in a different location, the structure of the caliper C is essentially the same for the front wheel W and rear wheel. Thus, any differences between the front and rear systems are immaterial to this disclosure and need not be described herein.

Figure 2:
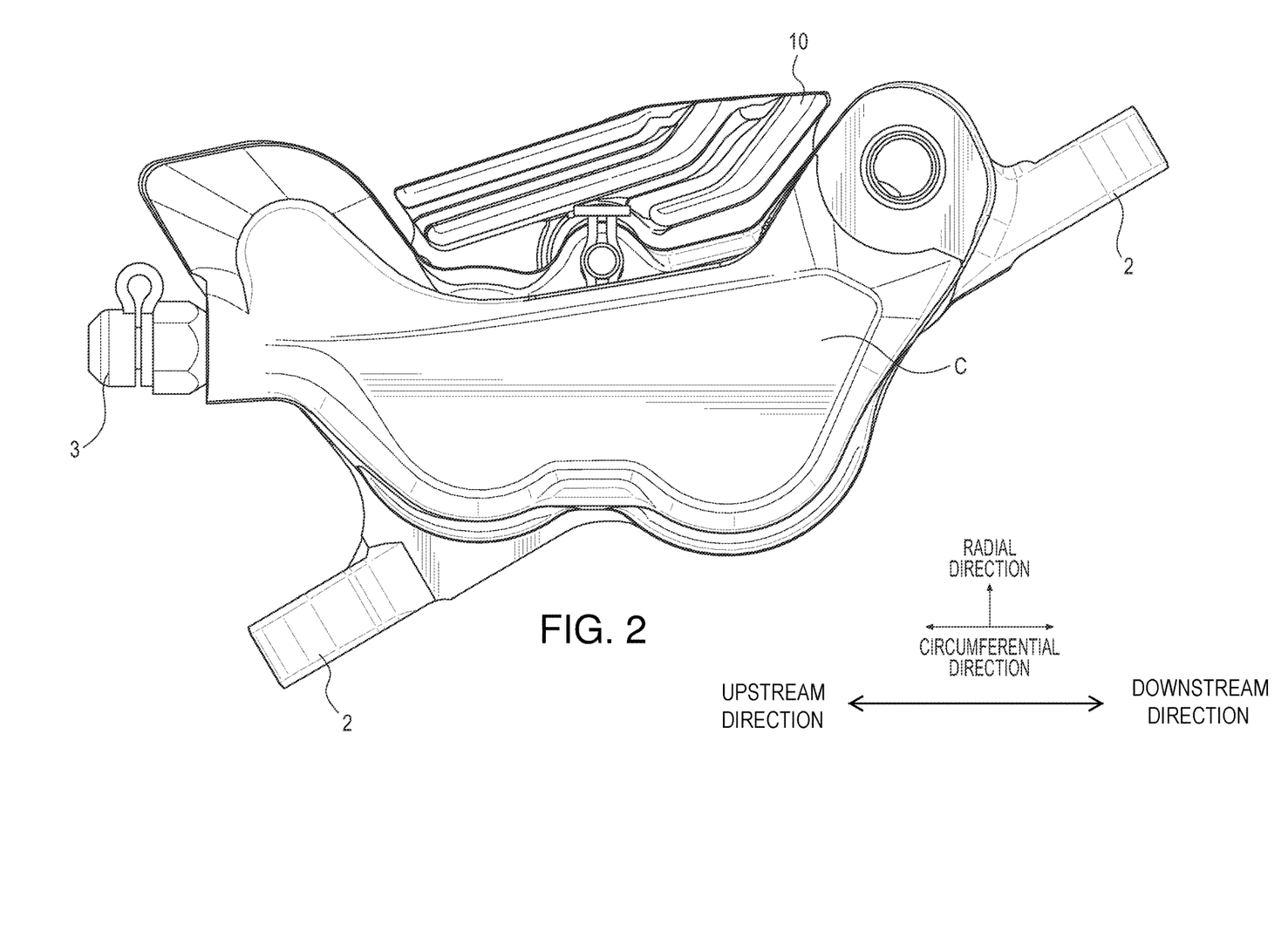
FIG. 2 shows an exemplary embodiment of a caliper.
Figure 3:
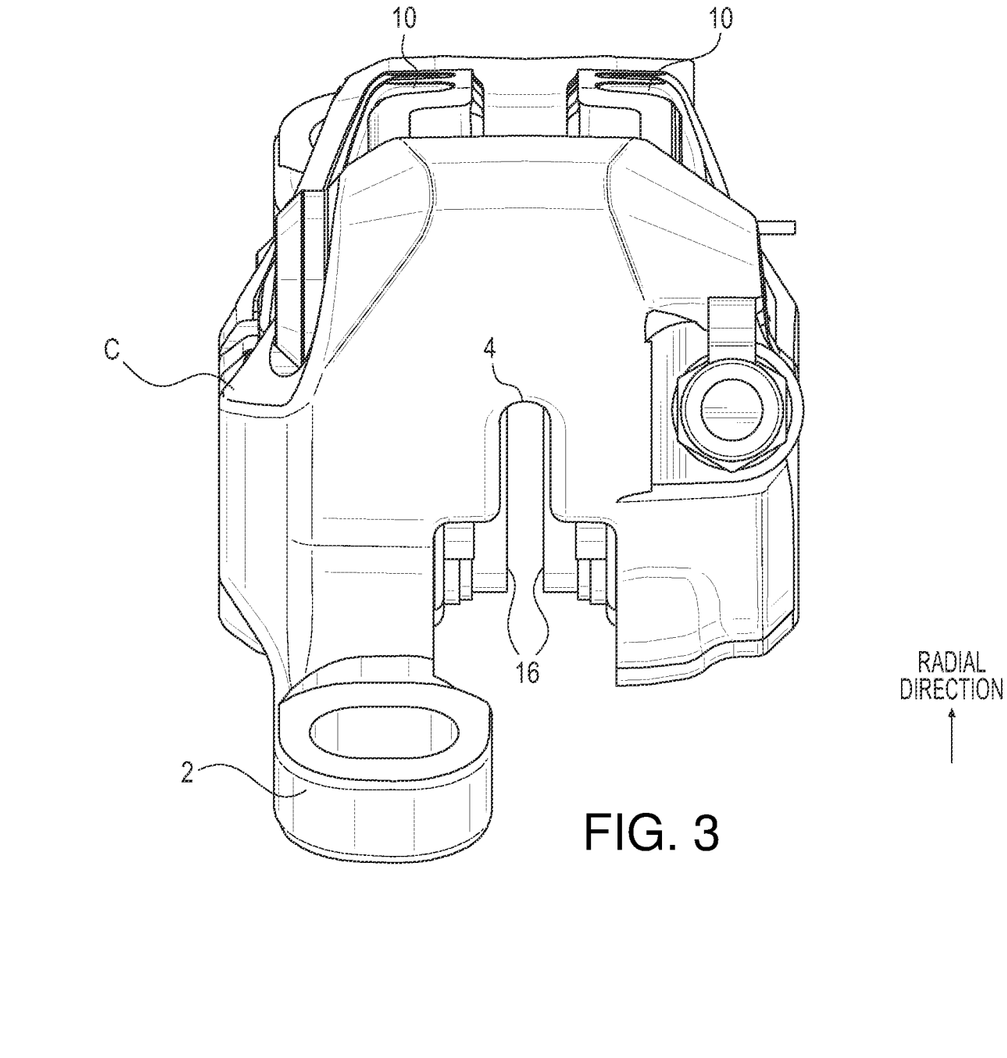
FIG. 3 shows the exemplary embodiment of a caliper.

FIGS. 2 and 3 show an exemplary embodiment of a caliper C containing brake pads 10. In general, the housing of the caliper C may include two attachment points 2 for attaching the caliper C to the bicycle, a bleed port 3 for bleeding hydraulic fluid, and an internal gap 4, for allowing the disc D to pass between the brake pads 10 within the caliper C. Friction members 16 of each brake pad 10, which forcibly contact the disc D to effectuate braking, can be seen through the gap 4.

Figure 4:
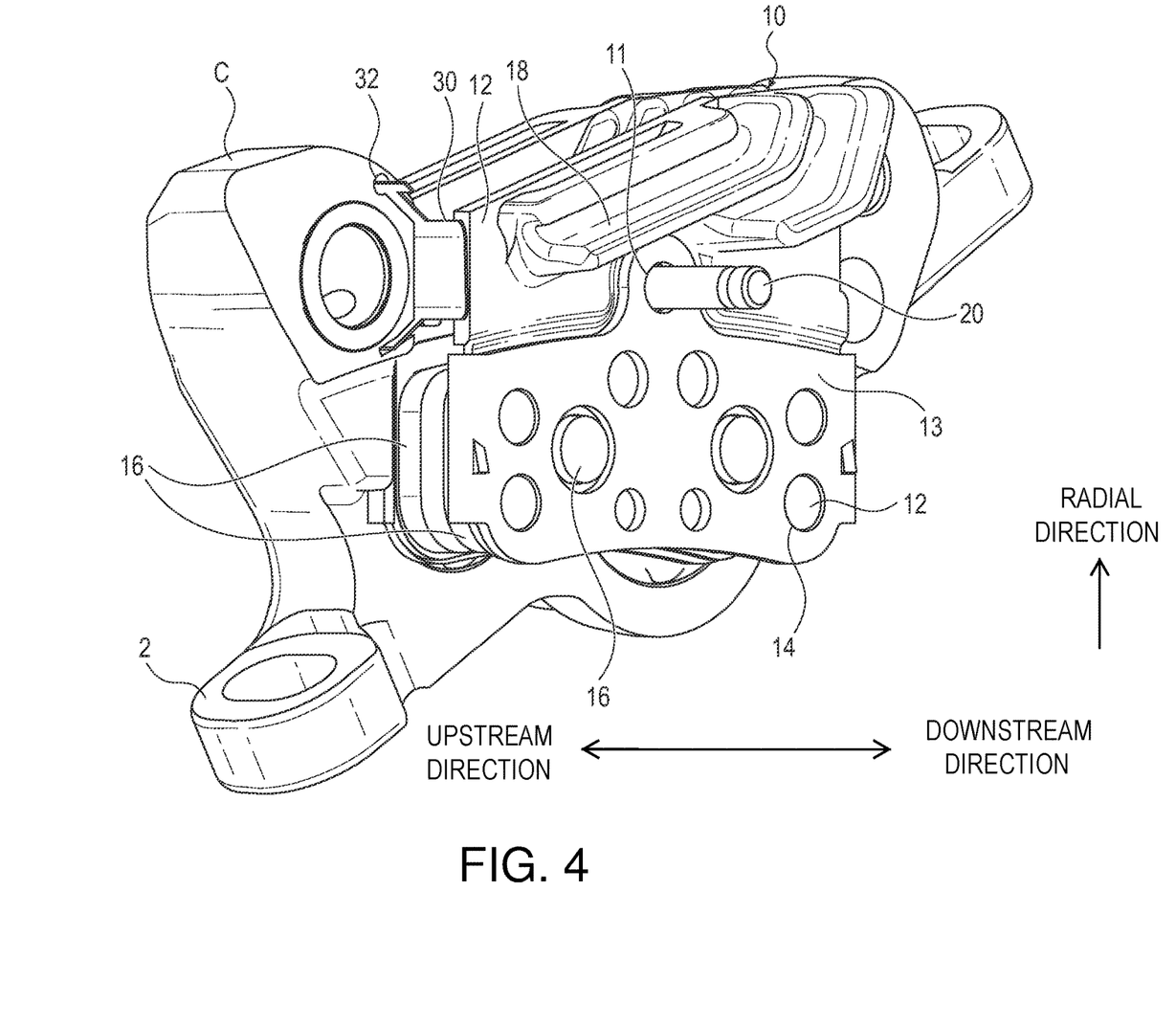
FIG. 4 shows the exemplary embodiment of the caliper with a part of the caliper removed.
Figure 5:
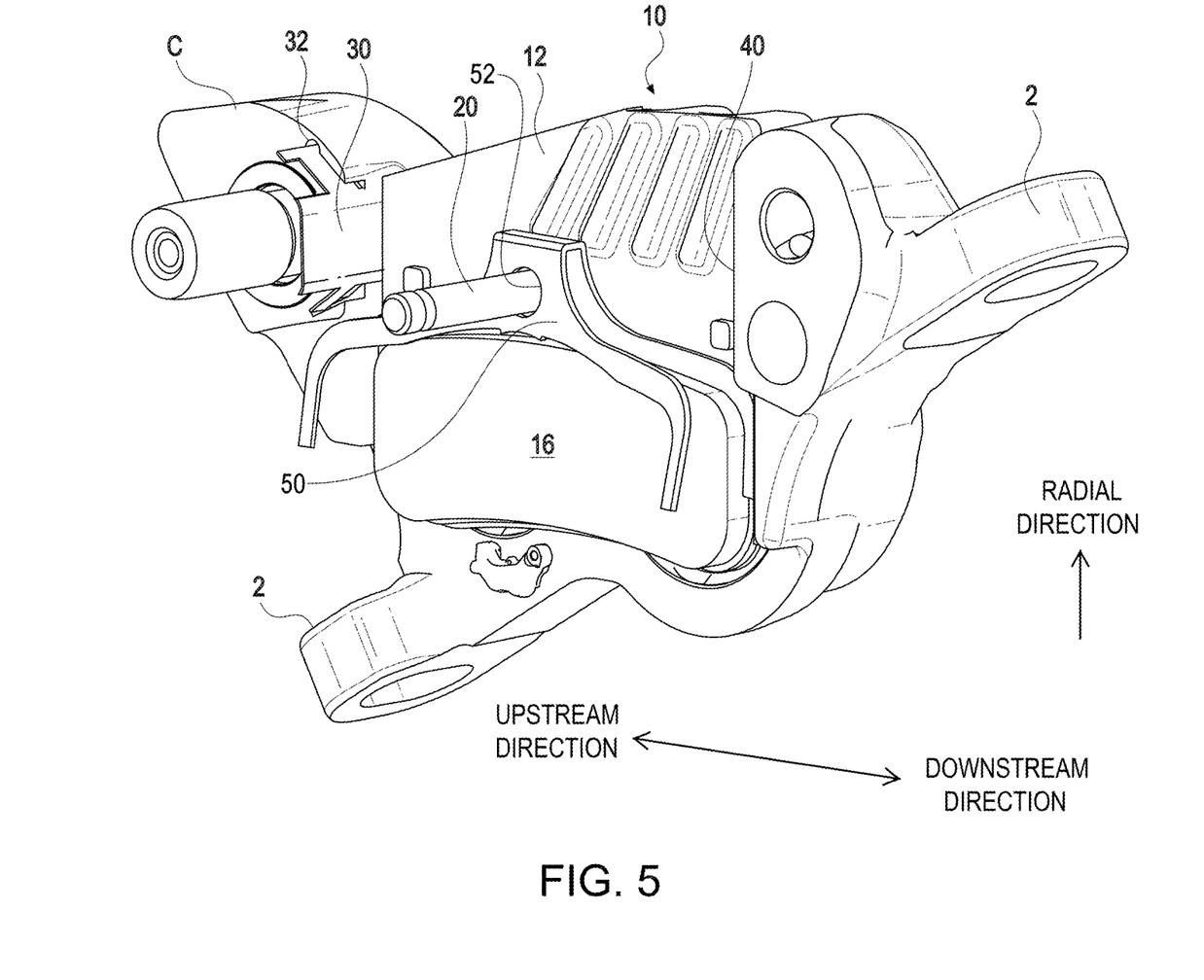
FIG. 5 shows the exemplary embodiment of the caliper with a part of the caliper and one of the brake pads removed.
Figure 6:
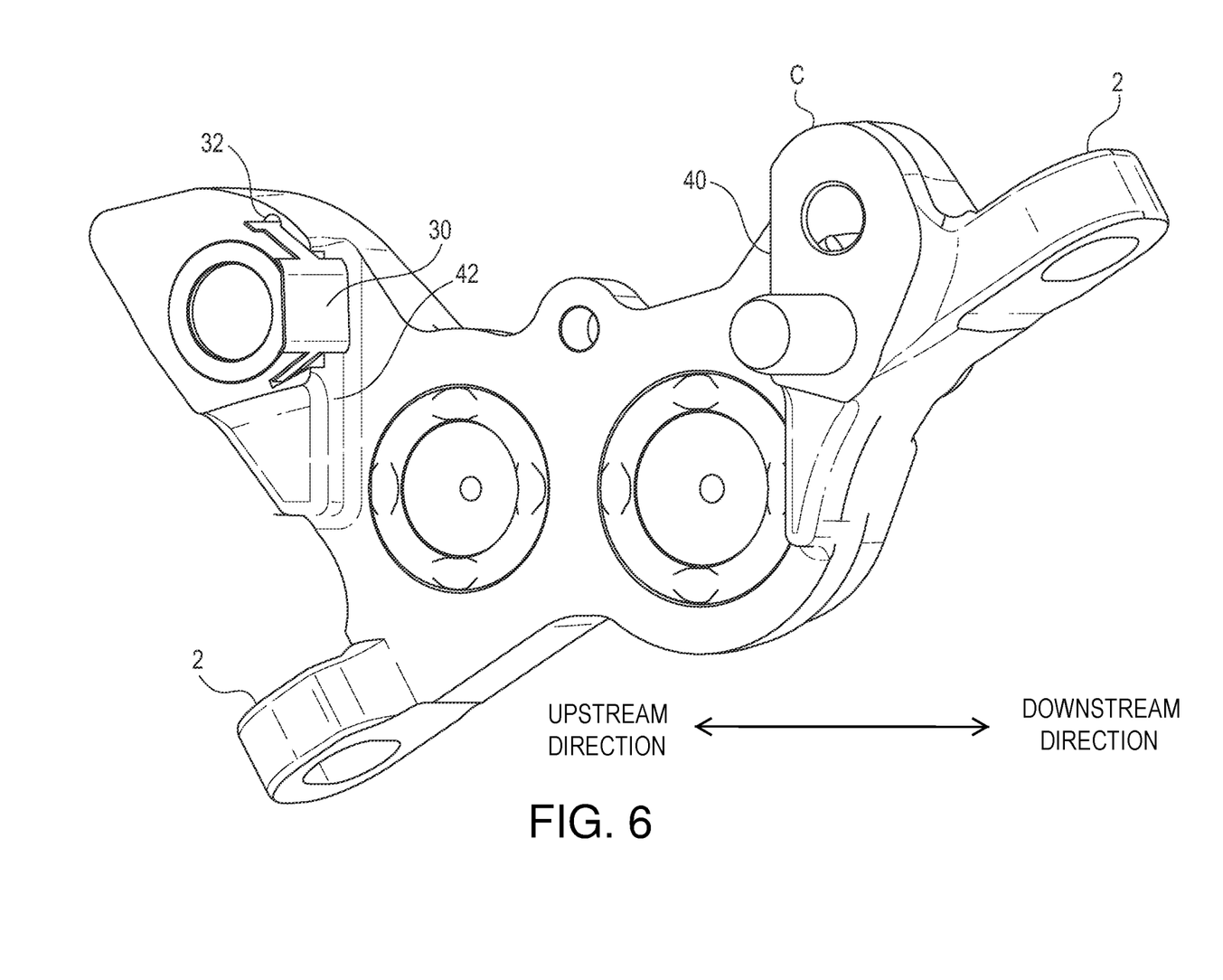
FIG. 6 shows the exemplary embodiment of the caliper with a part of the caliper and both of the brake pads removed.

FIG. 4 shows an exemplary embodiment of the internal structure of the caliper C. That is, in FIG. 4, part of the caliper C is removed (i.e., not shown) so the structure inside the caliper C can be clearly seen. In FIG. 4, an outward facing surface of a brake pad 10 is exposed. Here, "outward facing" means the surface of the brake pad 10 that faces away from the disc and towards an inner surface of the caliper C. FIG. 5 shows the exemplary embodiment of the internal structure of the caliper C, from another angle and with one of the brake pads 10 removed so that an inward facing surface of the remaining brake pad 10 is exposed. FIG. 6 shows the exemplary embodiment of the internal structure of the caliper C with both brake pads 10 removed.

As can be seen, the brake pad 10 includes a support plate 12 that supports the friction member 16. The friction member 16 is adhered or otherwise fixed to an inward facing side (shown in FIG. 5) of the support plate 12. The support plate 12 can include a reinforcement plate 13, which can include a number of holes 14. Cylindrical projections of the support plate 12 and/or friction member 16 may protrude into the holes 14. This way, the cylindrical projections can help prevent movement of the support plate 12 relative to the reinforcement plate 13 and the friction member 16 relative to the support plate 12. This arrangement can be especially useful to prevent movement of the support plate 12 relative to the reinforcement plate 13 and/or friction member 16 relative to the support plate 12 in a circumferential direction of the disc D under braking load. The support plate 12 can be made from plastic, resin, polymer, alloy, or any other suitable material. The reinforcement plate 13 can be made from steel, other alloys, or any other suitable material.

FIGS. 4-6 also show a biasing member 30. Biasing member 30 can be made of a resilient material such as, for example, steel, any other alloy, or even carbon fiber. Biasing member 30 can be located within the caliper C at any location to bias the brake pad 10 in a downstream direction when the brake pad 10 is in the non-braking position, the downstream direction being parallel to a direction of rotation of the disc when a wheel of the bicycle is rotating to move the bicycle forward. The caliper C housing comprises a first housing wall that is located in the downstream direction relative to the brake pad and the biasing member is configured to bias the brake pad against the first housing wall so that the brake pad contacts the first housing wall in both the braking position and the non-braking position. In other words, in this embodiment, the brake pad 10 is biased so that it is pushed up against a downstream interior wall 40 of the caliper C when the brake pad 10 is in both the braking position and the non-braking position. As used herein the terms "downstream" and "upstream" refer to a direction of rotation of the disc D within the caliper C. In particular, "downstream" means in a direction of rotation and "upstream" means in a direction opposite a direction of rotation. So for example, the bleed port 3 is in an upstream location on the caliper C because the disc D rotates from an end of the caliper C with the bleed port 3 toward an end of the caliper C without the bleed port 3. These directions are clearly labeled in FIGS. 2 and 4-6.

By pushing the brake pad 10 against a downstream interior wall 40 of the caliper C, movement of the brake pad 10 within the caliper C is prevented or minimized. In particular, movement of the brake pad 10 in the upstream and downstream directions is primarily prevented. However the biasing, force can also prevent or reduce movement of the brake pad 10 in the radial direction as well. Movement is the radial direction is less of a concern for the biasing member 30 at least because can it can be prevented by other structure within the caliper C (such as, for example, by the structure described in Applicant's application having, which is incorporated by reference herein in its entirety).

In this embodiment, the biasing member 30 is located between an upstream interior wall 42 of the caliper C and the brake pads 10. Because of the resiliency of the biasing member 30 and because the biasing member 30 is located upstream of the brake pads 10, the brake pad 10 is pushed against a downstream interior wall 40 of the caliper C both when the brake pads 10 are in a braking position and when they are in a non-braking position. That is, the tendency of the brake pads 10 to move downstream during braking works with the downstream pressure on the brake pads 10 provided by the resiliency of the biasing member 30 rather than against it. Using the biasing member 30 in this way, it is also easier to remove and install the brake pads 10, because a user can press a brake pad 10 against the biasing member 30 to create space to easily remove or install the brake pad 10. As shown in FIG. 4-6, to perform its biasing function, biasing member 30 can contact both the upstream interior wall 42 of the caliper C and the brake pads 10. That is, in addition to the first wall, the housing of the caliper C comprises a second housing wall that is located in an upstream direction relative to the brake pad 10 (the upstream direction being opposite the downstream direction), and the biasing member 30 contacts both the second housing wall and the brake pad 10 in order to bias the brake pad 10 in the downstream direction. This way, by virtue of its resiliency, the biasing member 30 can reliably push the brake pads 10 away from the upstream interior wall 42 in a downstream direction until it contacts the downstream interior wall 40. The basing member can contact any part of the brake pad 10 but, in this embodiment, it contacts the support plate 12 of the brake pad 10. Specifically, as shown in FIGS. 4 and 5, the support plate 12 extends upward beyond the friction member 16 in a direction parallel to a radial direction of the disc D, and the biasing member 30 contacts an upstream side of this extended part of the support plate 12. Stated another way, a support member (support plate 12) that has an extension portion extending beyond the friction member 16 in a direction parallel to a radial direction of the disc D in the state of the housing of the caliper C is installed on the bicycle, and the biasing member 30 contacts the extension portion in order to bias the brake pad 10 in the downstream direction. The biasing member 30 can be located or embedded within an opening 32 inside the upstream interior wall 42. Alternatively, a part of the biasing member 30 can be entirely embedded within the upstream interior wall 42 during manufacture so that no hole needs to be provided.

Figure 7:
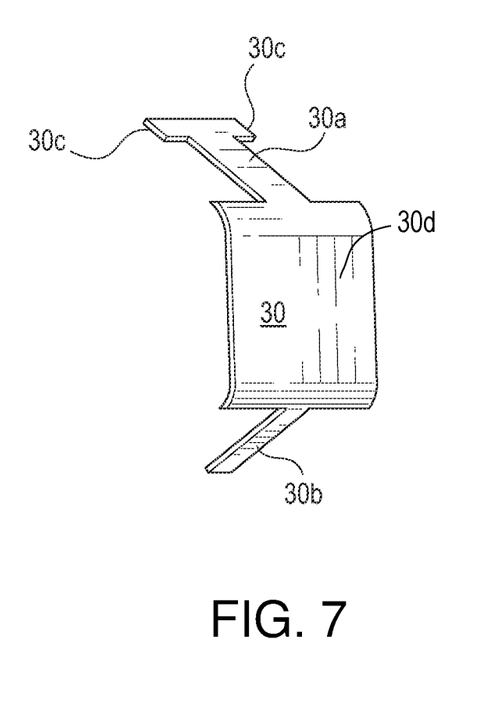
FIG. 7 shows an exemplary embodiment of a biasing member.
Figure 8:
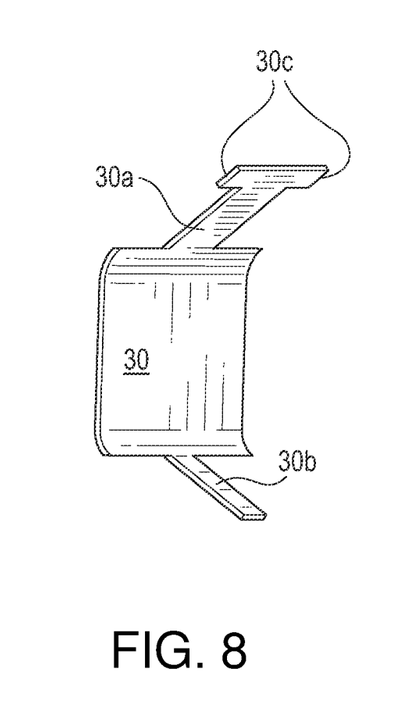
FIG. 8 shows the exemplary embodiment of a biasing member.

As shown more clearly in FIGS. 7 and 8, to perform the biasing function, in addition to its main body, the biasing member 30 can have an upper tab 30*a* and a lower tab 30*b* that each contact the second housing wall (upstream interior wall 42). The upper tab 30*a* can have protrusions 30*c* that allow the upper tab 30*a* to be irremovably located or embedded within the opening 32 in the upstream interior wall 42. The lower tab 30*b* need not have any projections, because as shown in FIGS. 4-6, it need not be connected or fixed to the upstream interior wall 42. Rather, the lower tab 30*b* can contact and move along the outside surface of the upstream interior wall 42 or within an opening in the upstream interior wall 42. The ability of the lower tab 30*b* to move facilitates flexing of the biasing member 30 so that it can effectively press on the support plate 12. Further, as shown, a central part of the biasing member 30 can have a contact surface 30*d*. The contact surface 30*d* can be wide enough to simultaneously contact the support plate 12 of each brake pad 10. This allows a single biasing member 30 to be used for both brake pads 10 within the caliper C. In other words, the biasing 30 member contacts a first extension portion of the first brake pad and a second extension portion of the second brake pad simultaneously to bias both the first brake pad and the second brake pad in a same direction parallel to a rotational direction of the disc D. The upper tab 30*a* is located radially outward of the contact surface 30*d* in the state of the caliper C housing being installed on the bicycle, and the lower tab 30*b* is located radially inward of the contact surface 30*d* in the state of the caliper C housing being installed on the bicycle.

Of course, the specific shapes of the biasing member 30 and its constituent parts shown in FIGS. 7 and 8 are only one example, and the biasing member 30 can have any shape or be comprised of any shapes that achieve the function of biasing one or both brake pads 10 to reduce or prevent movement of the brake pad(s) 10 within the caliper C.

Figure 9:
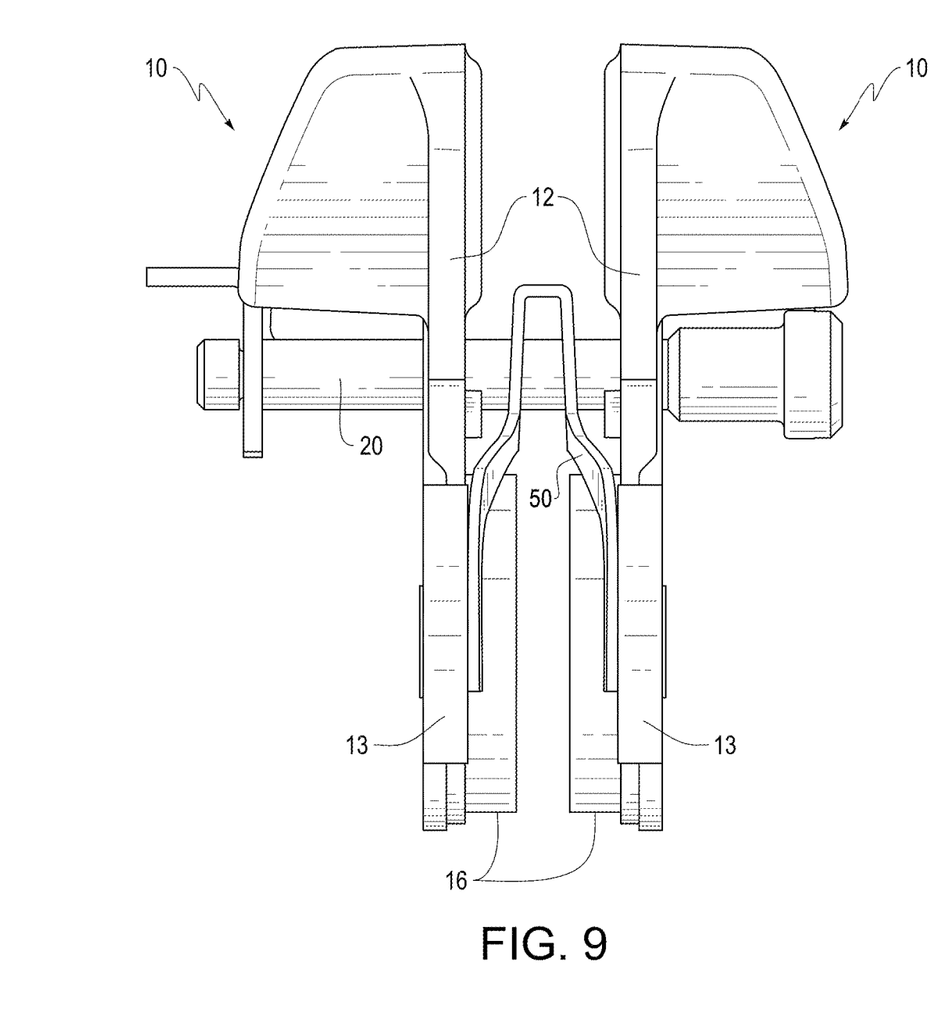
FIG. 9 shows the exemplary embodiment of the caliper with the caliper housing removed.

As shown in FIGS. 5 and 9, the caliper C can include a pad fixing spring 50. The pad fixing spring 50 contacts the support plate 12 of each brake pad 10 at parts of the support plate 12 that are adjacent to the friction member 16. In so doing, the pad fixing spring 50 biases the brake pads 10 away from the disc D and towards an inner surface of the housing of the caliper C so that the brake pads 10 are in a proper position relative to the disc D and/or the caliper C especially when the brake pads 10 are in the non-braking position. The pad fixing spring 50 can be made of a resilient material such as, for example, steel, any other alloy, or even carbon fiber. The pad fixing spring 50 includes a spring mounting hole 52 through which the mounting pin 20 is inserted. As shown in FIG. 5, the shape of the spring mounting hole 52 can be circular. But, the spring mounting hole 52 can have any shape that matches a shape of the mounting hole 11 and/or mounting pin 20. By biasing the brake pads 10 away from the disc D and towards an inner surface of the housing of the caliper C, the pad fixing spring 50 helps to further prevent unwanted rattling of the brake pads 10 within the housing of the caliper C.

In the above description and appended claims, the term "comprising" and its derivatives, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include," and their derivatives. As used herein, terms "radial" and "circumferential" are terms relating to the radius and circumference of the disc D.

Although the term circumferential can sometimes refer to a curved or circular direction, as used herein, a direction parallel to straight line tangent to the circumference of the disc D at each radial location is what is meant by the circumferential direction at that radial location.

While exemplary embodiments have been described to explain the inventive principles, it will be apparent to a skilled artisan that various changes and modifications can be made herein without departing from the broad inventive principles. For example, the size, shape, location or orientation of the various components can be changed as needed and/or desired as long as the intended result is achieved to at least some degree. Components that are shown directly connected or contacting each other can have intermediate structures disposed between them. The functions of one element can be performed by two, and vice versa. It is not necessary for all of the advantages described herein to be achieved by a particular embodiment at the same time. Thus, the foregoing descriptions of the exemplary embodiments need not limit the appended claims unless expressly recited therein.

What is claimed is:

1. A brake caliper for a bicycle, comprising:
   a housing configured to be installed on the bicycle, the bicycle including a disc attached to a wheel of the bicycle;
   a brake pad installed within the housing, the brake pad configured to move between a braking position and a non-braking position, the braking position being a location within the housing where the brake pad contacts the disc in a state where the housing is installed on the bicycle, and the non-braking position being a location within the housing where the brake pad is further from the disc than the braking position in a state where the housing is installed on the bicycle; and
   a biasing member configured to bias the brake pad in a downstream direction within the housing when the brake pad is in the non-braking position, the downstream direction being parallel to a direction of rotation of the disc when a wheel of the bicycle is rotating to move the bicycle forward,
   wherein:
      the housing comprises:
         a first housing wall that is located in the downstream direction relative to the brake pad; and
         a second wall that is located in an upstream direction relative to the brake pad, the upstream direction being opposite the downstream direction; and
      a downstream-facing surface of the biasing member is convexly shaped so that the biasing member contacts both the second housing wall and the brake pad while also maintaining a space between the biasing member and the second housing wall.

2. The brake caliper according to claim 1, wherein:
   the biasing member is configured to bias the brake pad against the first housing wall so that the brake pad contacts the first housing wall in both the braking position and the non-braking position.

3. The brake caliper according to claim 2, wherein:
   the housing comprises a second housing wall that is located in an upstream direction relative to the brake pad, the upstream direction being opposite the downstream direction; and
   the biasing member contacts both the second housing wall and the brake pad in order to bias the brake pad in the downstream direction.

4. The brake caliper according to claim 3, wherein:
   the brake pad comprises:
      a friction member; and
      a support member, the support member having an extension portion extending beyond the friction member in a direction parallel to a radial direction of the disc in the state of the housing being installed on the bicycle; and
   the biasing member contacts the extension portion in order to bias the brake pad in the downstream direction.

5. The brake caliper according to claim 4, wherein:
   the biasing member comprises:
      a contact surface that contacts the support member;
      a lower tab located radially inward from the contact surface in the radial direction of the disc in the state of the housing being installed on the bicycle; and
      an upper tab, the upper tab being located radially outward from the contact surface in the radial direction of the disc in the state of the housing being installed on the bicycle; and
   both the lower tab and the upper tab contact the second housing wall in order to bias the brake pad in the downstream direction.

6. The brake caliper according to claim 5, wherein the upper tab is connected to the second housing wall.

7. The brake caliper according to claim 6, wherein the upper tab is embedded within the second housing wall.

8. The brake caliper according to claim 5, wherein the lower tab contacts the second housing wall, but is not connected to the second housing wall.

9. The brake caliper according to claim 1, wherein the biasing member is made of a resilient material.

10. A brake caliper for a bicycle, comprising:
    a housing configured to be installed on the bicycle, the bicycle including a disc attached to a wheel of the bicycle, the housing including a bleed port;
    a brake pad configured to move between a braking position and a non-braking position, the braking position being a location in the housing where the brake pad contacts the disc in a state where the housing is installed on the bicycle, and the non-braking position being a location in the housing where the brake pad is further from the disc than the braking position in a state where the housing is installed on the bicycle; and
    a biasing member configured to bias the brake pad within the housing in a direction away from the bleed port in the non-braking position;
    wherein:
       the housing comprises:
          a first housing wall that is located in the direction away from the bleed port relative to the brake pad; and
          a second wall that is located in a direction toward the bleed port relative to the brake pad; and
       a brake-pad-facing surface of the biasing member is convexly shaped so that the biasing member contacts both the second housing wall and the brake pad while also maintaining a space between the biasing member and the second housing wall.

11. The brake caliper according to claim 10, wherein:
    the biasing member is configured to bias the brake pad against the first housing wall so that the brake pad contacts the first housing wall in both the braking position and the non-braking position.

12. The brake caliper according to claim 11, wherein:
    the housing comprises a second housing wall that is located in a direction toward the bleed port relative to the brake pad; and the biasing member contacts both the second housing wall and the brake pad in order to bias the brake pad away from the second housing wall in the direction away from the bleed port.

13. The brake caliper according to claim 12, wherein:
the brake pad comprises:
    a friction member; and
    a support member, the support member having an extension portion extending beyond the friction member in a direction parallel to a radial direction of the disc in the state of the housing being installed on the bicycle; and
the biasing member contacts the extension portion in order to bias the brake pad in the direction away from the bleed port.

14. The brake caliper according to claim 13, wherein:
the biasing member comprises:
    a lower tab located radially inward from the brake-pad-facing surface in the radial direction of the disc in the state of the housing being installed on the bicycle; and
    an upper tab, the upper tab being located radially outward from the brake-pad-facing surface in the radial direction of the disc in the state of the housing being installed on the bicycle; and
both the lower tab and the upper tab contact the second housing wall in order to bias the brake pad in the direction away from the bleed port.

15. The brake caliper according to claim 14, wherein the upper tab is connected to the second housing wall.

16. The brake caliper according to claim 15, wherein the upper tab is embedded within the second housing wall.

17. The brake caliper according to claim 14, wherein the lower tab contacts the second housing wall, but is not connected to the second housing wall.

18. The brake caliper according to claim 10, wherein the biasing member is made of a resilient material.

19. A brake caliper for a bicycle, comprising:
    a housing configured to be installed on the bicycle, the bicycle including a disc attached to a wheel of the bicycle;
    a first brake pad installed within the housing, the first brake pad configured to contact the disc in a state where the housing is installed on the bicycle, the first brake pad comprises:
        a first friction member; and
        a first support member, the first support member having a first extension portion extending beyond the first friction member in a direction parallel to a radial direction of the disc;
    a second brake pad installed within the housing, the second brake pad configured to contact the disc in a state where the housing is installed on the bicycle, and the second brake pad being provided in an opposite side from the first brake pad with respect to the disc, the second brake pad comprises:
        a second friction member; and
        a second support member, the second support member having a second extension portion extending beyond the second friction member in a direction parallel to the radial direction of the disc; and
    a biasing member contacting the first extension portion of the first brake pad and the second extension portion of the second brake pad simultaneously, the biasing member configured to bias both the first brake pad and the second brake pad in a same direction parallel to a rotational direction of the disc,
wherein:
    the housing comprises a housing wall; and
    a brake-pads-facing surface of the biasing member is convexly shaped so that the biasing member contacts the housing wall, the first extension portion, and the second extension portion to bias both the first brake pad and the second brake pad in the same direction parallel to the rotational direction of the disc while also maintaining a space between the biasing member and the housing wall.

20. The brake caliper according to claim 19, wherein the biasing member is made of a resilient material.

* * * * *